United States Patent Office 3,357,999
Patented Dec. 12, 1967

3,357,999
ANHYDROTRIACETYLERYTHRONOLIDE B
Thomas J. Perun, Waukegan, Ill., assignor to Abbott Laboratories, North Chicago, Ill., a corporation of Illinois
No Drawing. Filed Dec. 23, 1965, Ser. No. 516,079
1 Claim. (Cl. 260—343)

ABSTRACT OF THE DISCLOSURE 6,7-anhydro-3,5,11-triacetylerythronolide B and its preparation is described. The new compound is useful for the treatment of S. mansoni.

The present invention is directed to 6,7-anhydro-3,5,11-triacetylerythronolide B, a new, pharmaceutically useful product.

The new compound is active against parasitic infections, particularly schistosomiasis infections. Excellent results are obtained by treating warm-blooded animals infected with S. mansoni by intraperitoneal injections of 5–10 mg./kg./day for 1–5 days. In some instances, a single dose of 100 mg./kg. may be administered, but usually such a high dose is not needed except when only a single treatment is possible.

The new compound is made from erythronolide B which has been described as a hypocholesterolemic agent in U.S. 3,127,315. That molecule carries three hydroxy groups which are esterified with acetic acid. A solution of the formed triacetyl ester in an inert, organic solvent is treated with excess thionyl chloride in the presence of an anhydrous, organic, acid acceptor to remove one molecule of water from the erythronolide ring, leaving a double bond in the 5–6 positions. The preferred acid acceptor is pyridine although quinoline, dimethylaniline, N-methylpiperidine, triethylamine may be used in its place. Of course, the acid acceptor mentioned above can be used as the reaction medium alone or together with an organic solvent. The term "inert organic solvent" used above refers to an organic liquid which will dissolve at least 2% of the starting materials and will not react with either starting material nor the end-product formed, e.g. benzene, toluene, various ethers including tetrahydrofuran, etc. The dehydration reaction can be carried out at a temperature of between —15° and 25° C. and is completed within 15 minutes, but may be extended to several hours without adverse effect. After pouring the reaction mixture onto ice and letting it stand for several hours in the cold, 6,7-anhydro-3,5,11-triacetylerythronolide B crystallizes.

In order to illustrate a specific embodiment, reference is made to the following example.

Example

A solution of 10 g. of erythronolide B in 100 ml. of dry pyridine is combined with 40 ml. of acetic anhydride. The solution is heated on a steam-bath for 16 hours and thereafter cooled and poured into 500 ml. of ice-water. The solid formed is filtered, washed with water, dried and recrystallized from ethanol/water 1:1 to give 9.5 g. of the colorless needles of 3,5,11-triacetylerythronolide B melting at 190–191° C. The analytical values are in close agreement with those calculated for the empirical formula $C_{27}H_{44}O_{10}$.

A solution of 5 g. of 3,5,11-triacetylerythronolide B in 15 ml. of dry pyridine is stirred and cooled in ice while 5 ml. of thionyl chloride in 25 ml. of dry pyridine is added dropwise. After completion of the addition, the mixture is stirred at 0° C. for one hour and then poured onto cracked ice. The gummy solid formed is allowed to stand overnight in the cold. The crystallized solid so obtained is filtered, washed with water and dried to give 4.3 g. of crude 6,7-anhydro-3,5,11-triacetylerythronolide B melting at 147–148.5° C. After recrystallization from ethanol/water, long needles of the pure product are obtained melting at 148–149° C.

Others may practice the invention in any of the numerous ways which will be suggested to one skilled in the art by the present disclosure. All such practice of the invention is considered to be a part hereof provided it falls within the scope of the appended claim.

I claim:
6,7-anhydro-3,5,11-triacetylerythronolide B.

References Cited

Fieser, et al.: Adv. Org. Chem. (Reinhold Publ. Corp., New York, 1961), p. 142.

WALTER A. MODANCE, Primary Examiner.
C. SHURKO, Assistant Examiner.